(12) United States Patent
Sun et al.

(10) Patent No.: US 8,866,048 B2
(45) Date of Patent: Oct. 21, 2014

(54) LOW-TEMPERATURE HEAT-GENERATING SOLID WOOD LAMINATE FLOOR AND PREPARATION METHOD THEREOF

(75) Inventors: Bing Sun, Shanghai (CN); Yuming Zhang, Shanghai (CN)

(73) Assignee: Shanghai Rell Electric Heating Systems Co., Ltd, Shanghai (CN)

( * ) Notice: Subject to any disclaimer, the term of this patent is extended or adjusted under 35 U.S.C. 154(b) by 0 days.

(21) Appl. No.: 14/130,620

(22) PCT Filed: Jul. 4, 2012

(86) PCT No.: PCT/CN2012/000920
§ 371 (c)(1),
(2), (4) Date: Jan. 2, 2014

(87) PCT Pub. No.: WO2013/004074
PCT Pub. Date: Jan. 10, 2013

(65) Prior Publication Data
US 2014/0131342 A1    May 15, 2014

(30) Foreign Application Priority Data

Jul. 5, 2011    (CN) .......................... 2011 1 0186361

(51) Int. Cl.
*H05B 1/00*    (2006.01)
*F24D 13/02*    (2006.01)
(Continued)

(52) U.S. Cl.
CPC .............. *F24D 13/024* (2013.01); *B32B 37/06* (2013.01); *B32B 37/142* (2013.01);
(Continued)

(58) Field of Classification Search
CPC ........ B32B 37/06; B32B 37/10; B32B 37/12; B32B 37/1009; B32B 37/1018; B32B 37/1027; B32B 37/142; B32B 37/027; E04F 15/02; E04F 15/04; E04F 15/014; E04F 15/045; E04F 15/048; E04F 15/18; E04F 15/181; F24D 13/02; F24D 13/024; H01R 13/02; H01R 13/66; H01R 31/06; H01R 31/065
See application file for complete search history.

(56) References Cited

FOREIGN PATENT DOCUMENTS

| CN | 2359853 Y | 1/2000 |
|----|-----------|--------|
| CN | 2359853 Y | 1/2000 |

(Continued)

OTHER PUBLICATIONS

PCT/CN2012/000920 International Search Report mailed Aug. 30, 2012 by Xiqiu Luo.

*Primary Examiner* — Shawntina Fuqua
(74) *Attorney, Agent, or Firm* — RatnerPrestia (57) ABSTRACT

Disclosed is a low-temperature heat-generating solid wood laminate floor, which comprises: an exterior finished layer, an upper base material layer, a heat-generating layer, and a lower base material layer, which are stacked in sequence and hot-pressed. The upper base material layer, heat-generating layer and lower base material layer comprise 9 layers in total after hot-pressing, the heat-generating layer being positioned at the $5^{th}$ to the $7^{th}$ layer, the upper base material layer being above the heat-generating layer, the lower base material layer being below the heat-generating layer, the upper base material layer consisting of 3 to 5 layers, the lower base material layer consisting of 4 to 6 layers, and the exterior finished layer being provided on the upper base material layer by hot-pressing.

11 Claims, 8 Drawing Sheets

(51) Int. Cl.

| | | |
|---|---|---|
| *B32B 37/06* | (2006.01) | |
| *B32B 37/14* | (2006.01) | |
| *E04F 15/02* | (2006.01) | |
| *E04F 15/18* | (2006.01) | |
| *H01R 13/02* | (2006.01) | |
| *H01R 13/66* | (2006.01) | |
| *H01R 31/06* | (2006.01) | |
| *B27D 1/00* | (2006.01) | |

(52) U.S. Cl.
CPC ................ *E04F 15/02* (2013.01); *E04F 15/18* (2013.01); *F24D 13/02* (2013.01); *H01R 13/02* (2013.01); *H01R 13/66* (2013.01); *H01R 31/06* (2013.01); *B32B 2305/345* (2013.01); *B32B 2419/04* (2013.01); *B32B 2309/02* (2013.01)
USPC ............................. 219/213; 219/402; 144/346

(56) References Cited

FOREIGN PATENT DOCUMENTS

| | | |
|---|---|---|
| CN | 201007069 Y | 1/2008 |
| CN | 201169887 Y | 12/2008 |
| CN | 201203194 Y | 3/2009 |
| CN | 201203194 Y | 3/2009 |
| CN | 201215354 Y | 4/2009 |
| CN | 101600270 A | 12/2009 |
| CN | 101613982 A | 12/2009 |
| CN | 101660803 A | 3/2010 |
| CN | 101815373 A | 8/2010 |
| CN | 101844365 A | 9/2010 |
| CN | 201636972 U | 11/2010 |
| CN | 201688489 U | 12/2010 |
| CN | 201826484 U | 5/2011 |
| CN | 102312545 A | 1/2012 |
| CN | 202148674 U | 2/2012 |
| JP | 02-213082 | 8/1990 |
| JP | 3011586 A | 5/1995 |
| WO | WO 2009/055959 A1 | 5/2009 |

LOW-TEMPERATURE HEAT-GENERATING SOLID WOOD LAMINATE FLOOR AND PREPARATION METHOD THEREOF

CROSS-REFERENCE TO RELATED APPLICATIONS

This application is a U.S. National Phase Application of International Application PCT/CN2012/000920, filed Jul. 4, 2012, which claims the benefit of Chinese Application No. 201110186361.6, filed Jul. 5, 2011, the contents of which are incorporated herein by reference in their entireties for all purposes.

TECHNICAL FIELD

This invention relates to a type of wood flooring. To be specific, it relates to a type of low-temperature heat-generating wood flooring and a preparation method thereof.

BACKGROUND OF THE INVENTION

Current heating flooring is characterized by high temperature, which tends to lead to damage and fire accidents. In addition, such flooring has many disadvantages in terms of insulation, temperature control, durability and stability, among others.

China Patent No. CN101600270 discloses a conductive heating material and flooring containing conductive heating material and a preparation method thereof, wherein the heating materials of the flooring mainly contain graphite and conductive carbon black, thereby making a conductive heating coating material; the conductive heating coating material is then affixed to the base material of the wood flooring by means of printing. Due to fact that the heating material made of graphite and the fact that the conductive material is power-consuming, the flooring surface temperature is too high. Test data shows that the maximum surface temperature can reach 80° C. The wood flooring can easily deform, crack and burn at this high temperature. If this happens to the installed flooring, the consumers may suffer economic loss; in fact, consumers may even need to re-install the flooring. An occurrence such as this might even result in a dangerous accident.

Considering the above-described problems, this invention discloses a low-temperature heat-generating wood flooring and its preparation method, which contains the following technical features to solve existing problems.

SUMMARY OF THE INVENTION

The present invention relates to a low-temperature heat-generating wood flooring and the preparation method thereof, which can reduce the design power per unit area of the flooring by maintaining the maximum surface temperature at 50° C. to 55° C., thereby solving problems such as deformation and cracking, and improving the heat radiation and conduction.

The purpose of the present invention of this low-temperature heat-generating wood flooring and the preparation method thereof is achieved by means of the following technical solutions: a low-temperature heat-generating wood flooring comprising a top decorative layer, an upper base layer, a heat-generating layer and a lower base layer stacked and hot-pressed together. the upper base layer is on top of the heat-generating layer while the lower base layer is beneath the heat-generating layer; the upper base layer comprises 3 to 5 layers of substrate lumber-core boards whereas said lower base layer comprises 4 to 6 layers of bottom boards; said top decorative layer is disposed on the upper base layer by hot-pressing.

Said top decorative layer, the upper base layer, the heat-generating layer and the lower base layer are in the form of a strip; a pair of copper poles are disposed on widthwise edges on both ends of the heat-generating layer; the width of the copper poles is same as that of the heat-generating layer; a fireproof layer is disposed between the bottom of the upper base layer and the heat-generating layer whereas another fireproof layer is disposed between the top of the lower base layer and the heat-generating layer; and a reflective layer is disposed on the bottom of the lower base layer;

Said upper base layer is composed of a criss-cross of multi-layered substrate lumber-core boards arranged in different layers and glued together, whereas the lower base layer is composed of a criss-cross of multi-layered bottom boards arranged in different layers and glued together.

The above-described low-temperature heat-generating wood flooring, wherein said heat-generating layer is carbon fiber conductive paper and there are multiple small holes on said carbon fiber conductive paper; said copper poles are made of copper-aluminum foil by pressing.

The above-described low-temperature heat-generating wood flooring, wherein said pair of through holes are disposed on both ends of said lower base layer and the positions of the through holes correspond to the positions of the copper poles on said heat-generating layer The above-described low-temperature heat-generating wood flooring further comprises: terminals and thermosensitive elements; wherein said terminals include male terminals, female terminals, connection male terminals, connection female terminals and a pair of connection wires; the size of said connection male terminals corresponds to the size of the connection female terminals; the size of the male terminals corresponds to the size of the female terminals; the female terminals is disposed in the through hole of the lower base layer and contacts the copper poles on said heat-generating layer; a pair of connection wires are disposed on the male terminals by press fitting; the connection male terminal is externally connected to a connection female terminal in the same device; the connection female terminal is externally connected to a male terminal in the same device;

Said thermosensitive elements are disposed on the male terminals.

A preparation method for the low-temperature heat-generating wood flooring, wherein the method comprises at least the following steps:

Step 1: Prepare the upper base layer by hot-pressing; Step 2: Prepare the heat-generating layer by hot-pressing; Step 3: Prepare the lower base layer by hot-pressing; Step 4: Prepare the substrate of the low-temperature heat-generating wood flooring by hot-pressing; Step 5: Install terminals and the thermosensitive elements on the low-temperature heat-generating wood flooring.

The preparation method for the low-temperature heating engineered wood flooring, wherein said Step 1 further comprises:

Step 1.1: Select and apply glue to substrate lumber-core boards; Step 1.2: Arrange the glued substrate lumber-core boards of Step 1.1 in a criss-cross way in 3-5 layers and glue them together; Step 1.3: Apply glue to the bottom of the substrate lumber-core boards of Step 1.2, and affix the fireproof layer on it; the length and width of the fireproof layer correspond to those of the substrate lumber-core boards; Step 1.4: Make the upper base layer by hot-pressing the substrate lumber-core boards processed in Step 1.3

The preparation method for the low-temperature heat-generating wood flooring, wherein said Step 1 further comprises:

Step 2.1: Dip treat the carbon fiber conductive paper with polyvinyl alcohol solution with a concentration of 10%-20%; after the dip treatment, the adhesion of polyvinyl alcohol on the carbon fiber conductive paper is 15%-30%; then dry the carbon fiber conductive paper; Step 2.2: carry out impregnation resin treatment on the carbon fiber conductive paper of Step 2.1 with resin made from one or several of thermosetting phenolic resin or epoxy resin; Step 2.3: Carry out carbonization treatment on the carbon fiber conductive paper obtained in Step 2.2; Step 2.4: Trim the carbon fiber conductive paper obtained in Step 2.3; Step 2.5: Press copper poles (31) on two wide edges of the carbon fiber conductive paper obtained trimmed in Step 2.4, respectively; the width of the copper poles is same as the width of the carbon fiber conductive paper; Step 2.6: Heat the carbon fiber conductive paper on which the copper poles are pressed in Step 2.5; Step 2.7: Glue nail the carbon fiber conductive paper obtained in Step 2.6 to prepare the heat-generating layer.

The preparation method for the low-temperature heat-generating wood flooring, wherein said Step 3 further comprises Step 3.1: Select the bottom boards of the lower base layer and apply glue to one side of the bottom boards; Step 3.2: Glue reflective layer on the glue-applied side of the bottom boards; the length of the reflective layer is the same as that of the bottom boards; Step 3.3: hot-press the reflective layer and the bottom boards; Step 3.4: Apply glue to non-reflective side of the hot-pressed bottom boards; Step 3.5: apply glue to both sides of other bottom boards for the lower base layer and arrange these boards with the glued bottom boards of Step 3.4 in a criss-cross way in 4-6 layers and glue them together; Step 3.6: Apply glue to the upper side of the bottom boards obtained in Step 3.5 and glue the fireproof layer on it; the width of the fireproof layer is the same as that of the bottom boards; hot-press the bottom boards to get the lower base layer; Step 3.7: Make through holes on the lower base layer; the positions of the through holes correspond to the positions of the copper poles.

The preparation method for the low-temperature heat-generating wood flooring, wherein said Step 4 further comprises:

Step 4.1: Apply glue to the side with the fireproof layer of the upper base layer and lower base layer; Step 4.2: Place the female terminals of the terminals into the through hole of the lower base layer; Step 4.3: Glue the heat-generating layer on the lower base layer; the copper poles on the lower base layer contact the female terminals; Step 4.4: Paste and cover the heat-generating layer with the upper base layer and implement hot-pressing thereon; Step 4.5: Implement conditioning treatments on base materials hot-pressed in Step 4.4 for 5-15 days to obtain the base materials for low-temperature heat-generating wood flooring;

The preparation method for the low-temperature heat-generating wood flooring, wherein said Step 5 further comprises:

Step 5.1: Press the top decorative layer on the base materials for low-temperature heat-generating wood flooring to obtain low-temperature heat-generating wood flooring; Step 5.2: Press the connection wires on the male terminals; press two connection wires on one male terminal; Step 5.3: Press the connection male terminals and the connection female terminals, respectively, on the other end of said pair of connection wires; Step 5.4: Insert thermosensitive elements in the male terminal.

Due to the foregoing technical solutions the present invention, a low-temperature heat-generating wood flooring and the preparation method thereof, possesses the following merits and positive attributes:

1. The present invention relates to a low-temperature heat-generating wood flooring with a maximum temperature of 50° C.-55° C. It remains at a low temperature while it continues heating; therefore the flooring will not deform, crack or burn.
2. The low-temperature heat-generating wood flooring of the present invention uses carbon fiber conductive paper, the thermal conversion efficiency of which can reach up to 97%; therefore it is more energy-efficient than traditional materials. Carbon fiber conductive paper transfers heat mainly by means of infrared radiation. The heat conduction can also release far infrared light waves of 8 μm-18 μm, which can revitalize water molecules in the human body, increase blood oxygen content, strengthen cell viability, improve body microcirculation and promote metabolism.
3. The substrate of the low-temperature heat-generating wood flooring of the present invention, which has been shaped at high temperatures, is an insulator and has a moisture content of around 6%. Moreover, the entire surface of the carbon fiber conductive paper is electrically conductive at general voltage (220V), the electric current density of which is extremely low. Combined with the substrate's properties, the carbon fiber conductive paper is harmless to the human body and can be used safely.

The present invention is further described by the following embodiments. However, the embodiments are just examples of the application of the invention; the features disclosed thereby only aim to be used to explain and illustrate the technical solutions of the present invention without restricting the scope of protection of the invention.

DETAILED DESCRIPTION OF THE INVENTION

According to the claims of the invention and the content disclosed by the invention, the technical solution of the invention is detailed as follows:

As shown in FIG. 1-FIG. 6, the invention low-temperature heat-generating wood flooring comprises a top decorative layer 1, an upper base layer 2, a heat-generating layer 3 and a lower base layer 4 stacked and hot-pressed in sequence; wherein the upper base layer 2, the heat-generating layer 3 and the lower base layer 4 have a total of 8-12 layers after hot-pressing; and the upper base layer 2 is on top of the heat-generating layer 3 whereas the lower base layer 4 is underneath heat-generating layer 3; wherein the upper base layer 2 consists of 3-5 layers and the lower base layer 4 consists of 4-6 layers; wherein the top decorative layer 1 is hot-pressed on top of the upper base layer 2. The top decorative layer 1, the upper base layer 2, the heat-generating layer 3 and the lower base layer 4 are in the form of a strip; a pair of copper poles 31 are disposed on widthwise edges on both ends of heat-generating layer 3; the width of the copper poles 31 is same as that of the heat-generating layer 3; a polyethylene terephthalate resin layer 32 is covered on the front surface and the back surface, respectively, of heat-generating layer 3; the polyethylene terephthalate resin layer 32 is affixed to the heat-generating layer 3 by hot-pressing. A fireproof layer 5 is disposed between the bottom of the upper base layer 2 and heat-generating layer 3 whereas another fireproof layer 5 is disposed between the top of the lower base layer 4 and heat-generating layer 3; the heat-generating layer 3 can be melamine impregnated paper which is hot-pressed on the layer when hot-pressing the upper base layer 2 and the lower base layer 4, respectively; a reflective layer 41 is disposed on the bottom of the lower base layer 4.

Figure 1:
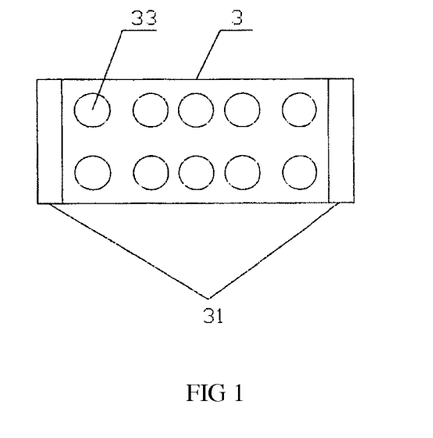
FIG. 1 shows the structure of the heat-generating layer of the low-temperature heat-generating wood flooring of the present invention.
Figure 2:
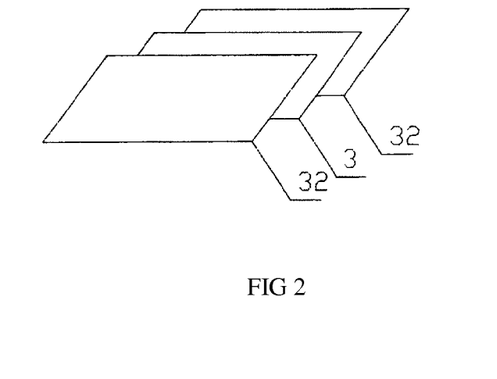
FIG. 2 shows the structure of the heat-generating layer of the low-temperature heat-generating wood flooring of the present invention in a preferred embodiment

The top decorative layer 1 can adopt commonly-used top layers in bottom boards industry such as oak, teak, merbau and cumaru, etc. Heat-generating layer 3 can use carbon fiber conductive paper with multiple small holes 33 on it in order to enable the polyethylene terephthalate resin infiltrate and bond better. Said copper poles 31 on the heat-generating layer 3 are made of copper-aluminum foil by pressing; the size of the heat-generating layer 3 can be adjusted according to the actual size of the wood flooring; the resistance of each piece of carbon fiber conductive paper is about 1500Ω-4000Ω.

Figure 4:
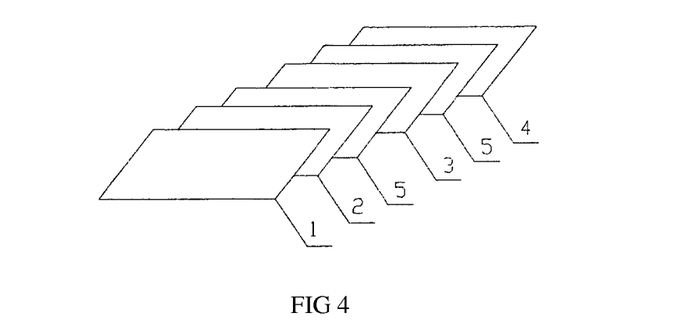
FIG. 4 shows the structure of the low-temperature heat-generating wood flooring of the present invention.

The upper base layer 2 is composed of a criss-cross of multi-layered substrate lumber-core boards arranged in different layers and glued together, whereas the substrate lumber-core boards can be lauan, poplar, beech or imported weedtree or a combination thereof.

Figure 3:
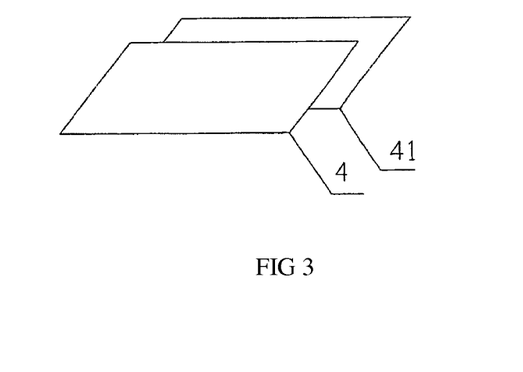
FIG. 3 shows the structure of the lower base layer of the low-temperature heat-generating wood flooring of the present invention

Reflective layer 41 can be aluminum foil of a thickness of 0.05 mm-0.2 mm; reflective layer 41 is fixed to the bottom of the lower base layer 4 by hot-pressing at the pressure of 80-150 tons for 5-30 minutes.

A pair of through holes 42 is disposed on the two ends of the lower base layer 4 respectively. The bore diameter of the through holes 42 is 6 mm-12 mm; the position of the through holes 42 corresponds to the position of the copper 31 on the heat-generating layer 3. The lower base layer 4 is composed of a criss-cross of multi-layered bottom boards arranged in different layers and glued together; the bottom boards are selected from lauan, poplar, beech or imported weedtree or a combination thereof, preferably beech.

Figure 5:
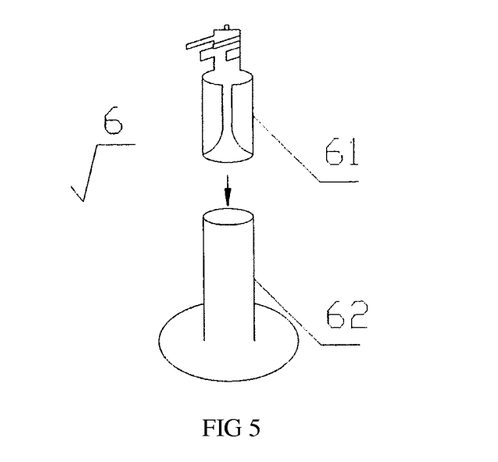
FIG. 5 shows the structure of terminals of the low-temperature heat-generating wood flooring of the present invention.
Figure 6:
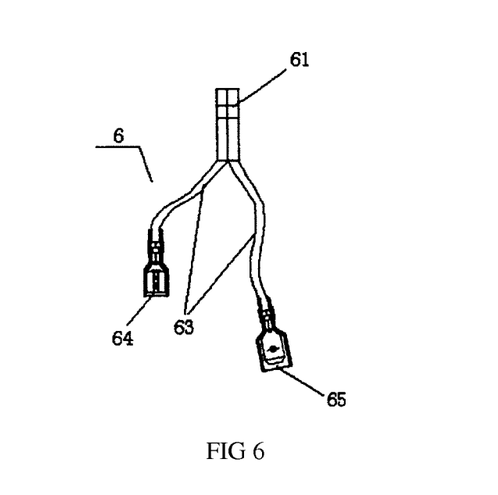
FIG. 6 shows the structure of connection terminals of the low-temperature heat-generating wood flooring of the present invention

The low-temperature heat-generating wood flooring further comprises: terminals 6 and thermosensitive elements not shown; wherein said terminals 6 include male terminals 61, female terminals 62, connection male terminals 65, connection female terminals 64 and a pair of connection wires 63; the size of said connection male terminals 65 corresponds to the size of the connection female terminals 64; the size of the male terminals 61 corresponds to the size of the female terminals 62; the female terminals 62 is disposed in the through hole 42 of the lower base layer 4 and contacts the copper poles 31 on said heat-generating layer 3; a pair of connection wires 63 are disposed on the male terminals 61 by press fitting; the connection male terminal 65 is externally connected to a connection female terminal in the same device; the connection female terminal 64 is externally connected to a male terminal in the same device; thereby forming a series connection between multiple pieces of low-temperature heat-generating wood flooring; wherein the terminals 6 form point connections between each piece of low-temperature heat-generating wood flooring. The thermosensitive elements sleeve on the male terminal 61; the maximum bearable temperature of the thermosensitive elements is 55° C.-65° C., and the maximum current intensity is 160 mA-240 mA. When the temperature and electric current of the substrate of the low-temperature heat-generating wood flooring reach the maximum bearable value, the thermosensitive elements automatically cut off power supply, thereby protect the temperature and electric current of the substrate of the low-temperature heat-generating wood flooring.

The low-temperature heat-generating wood flooring of the invention further comprises a temperature controller, wherein the temperature controller comprises a power switch, a temperature controller, a time controller and a temperature test-control probe that are in parallel connection to the connection wires (63).

Figure 7:
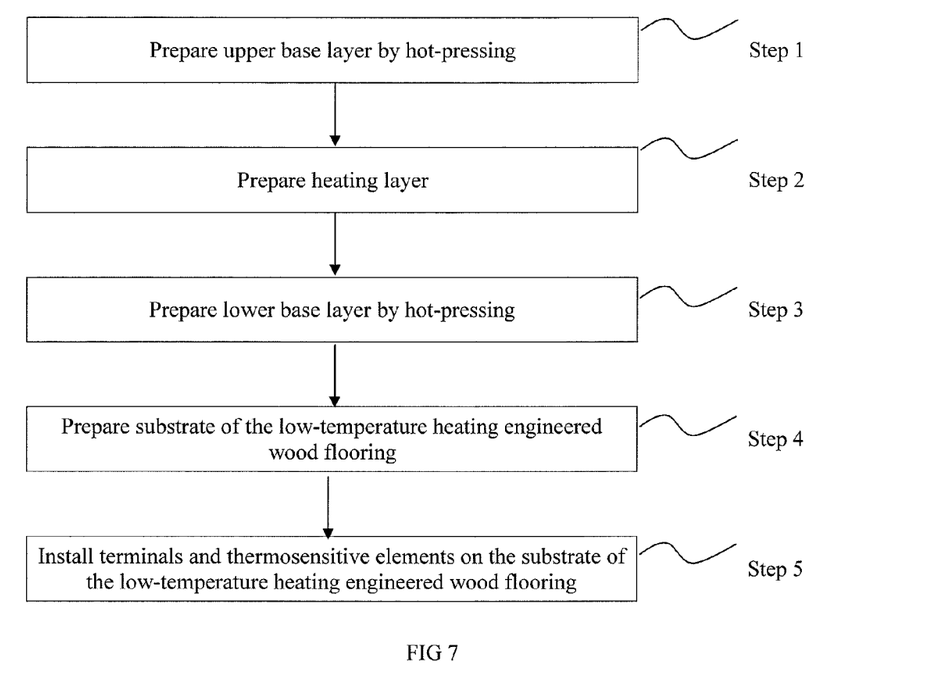
FIG. 7 is a flow chart for the preparation method of the low-temperature heat-generating wood flooring of the present invention
Figure 8:
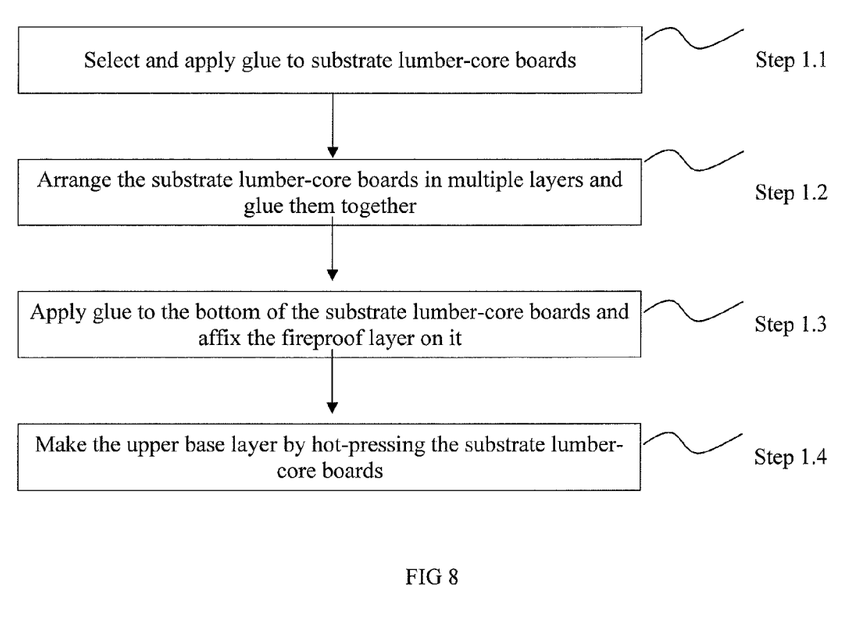
FIG. 8 is a step-by-step flow chart for Step 1 of the preparation method of the low-temperature heat-generating wood flooring of the present invention
Figure 9:
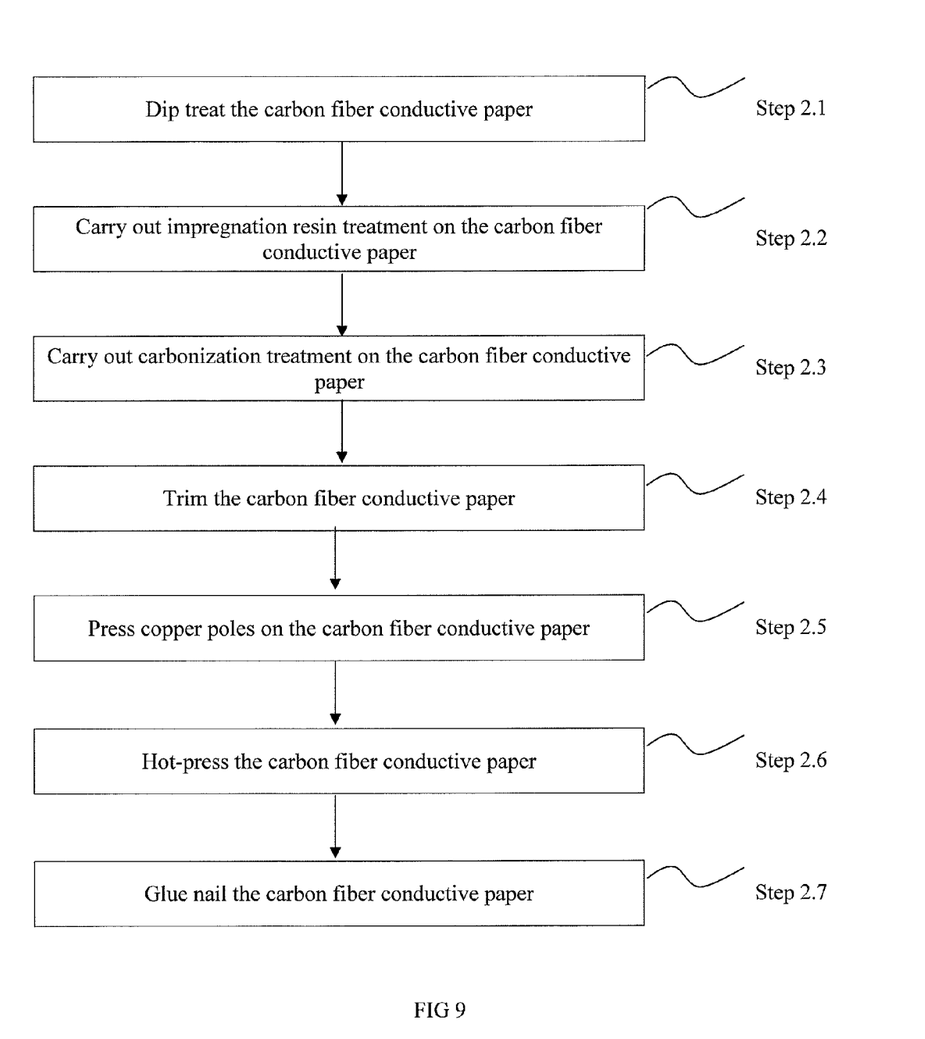
FIG. 9 is a step-by-step flow chart for Step 2 of the preparation method of the low-temperature heat-generating wood flooring of the present invention.

Please refer to the appended drawings 7-12. The method for preparing the low-temperature heat-generating wood flooring of the invention includes at least the following steps:
Step 1: Prepare the upper base layer (2) by hot-pressing.
Step 1.1: Select and glue the substrate lumber-core boards; the substrate lumber-core boards can select one or a combination of more of lauan, poplar, beech or imported weedtree, and the glue can be one or more of polyurethane resin, urea-formaldehyde resin adhesive or phenolic resin.
Step 1.2: Arrange the glued substrate lumber-core boards in step 1.1 in an orderly criss-crossed and layered form, and bond them together to form 3 layers to 5 layers.
Step 1.3: Glue the bottom of the substrate lumber-core boards in Step 1.2 and affix the fireproof layer (5); the fireproof layer (5) can use melamine impregnated paper, and its length and width match the substrate lumber-core boards
Step 1.4: Hot-press the substrate lumber-core boards prepared in Step 1.3 to form the upper base layer (2)
Step 2: Prepare the heat-generating layer (3) by hot-pressing
Step 2.1: Impregnate the carbon fiber conductive paper with 10%-20% concentration PVA solution; after the impregnation, the PVC adhesion amount on the carbon fiber conductive paper is 15%-30%; then dry the carbon fiber conductive paper.
Step 2.2: Conduct impregnating resin processing of the carbon fiber conductive paper prepared in Step 2.1 with resin comprising one or more from thermosetting phenol resin and epoxy resin; preference is given to ammoniation methyl phenolic resin.
Step 2.3: Conduct carbonization of the carbon fiber conductive paper prepared in Step 2.2 at a temperature of 200° C.-500° C. within 10-40 minutes.

Step 2.4: Cut out the carbon fiber conductive paper prepared in Step 2.3 according to actual needs; the length and width of the carbon fiber conductive paper can be 850*100 mm, 1200*115 mm or 1400*115 mm Step 2.5: Press and stab the copper poles (31) on the short-ways of the cut carbon fiber conductive paper in Step 2.4; the width of the copper poles (31) is equal to the width of the carbon fiber conductive paper.

Step 2.6: Hot-press the carbon fiber conductive paper after pressing and stabbing the copper holes in step 2.5 at the temperature of 150° C.-300° C. under the pressure of 60 kg/cm$^2$–100 kg/cm$^2$ within 15-60 minutes. As a preference, the hot-pressing is conducted after a polyethylene terephthalate resin layer (32) is covered on the front surface and the back surface of the carbon fiber conductive paper after pressing and stabbing the copper poles (31) in Step 2.5.

Step 2.7: Glue-nail the carbon fiber conductive paper prepared in Step 2.6 to form the heat-generating layer (3); the diameter of the glue nail is 8 mm-16 mm and the resistance of the glue nail is 1500Ω-4000Ω.

Step 3: Prepare the lower base layer (4) by hot-pressing

Figure 10:
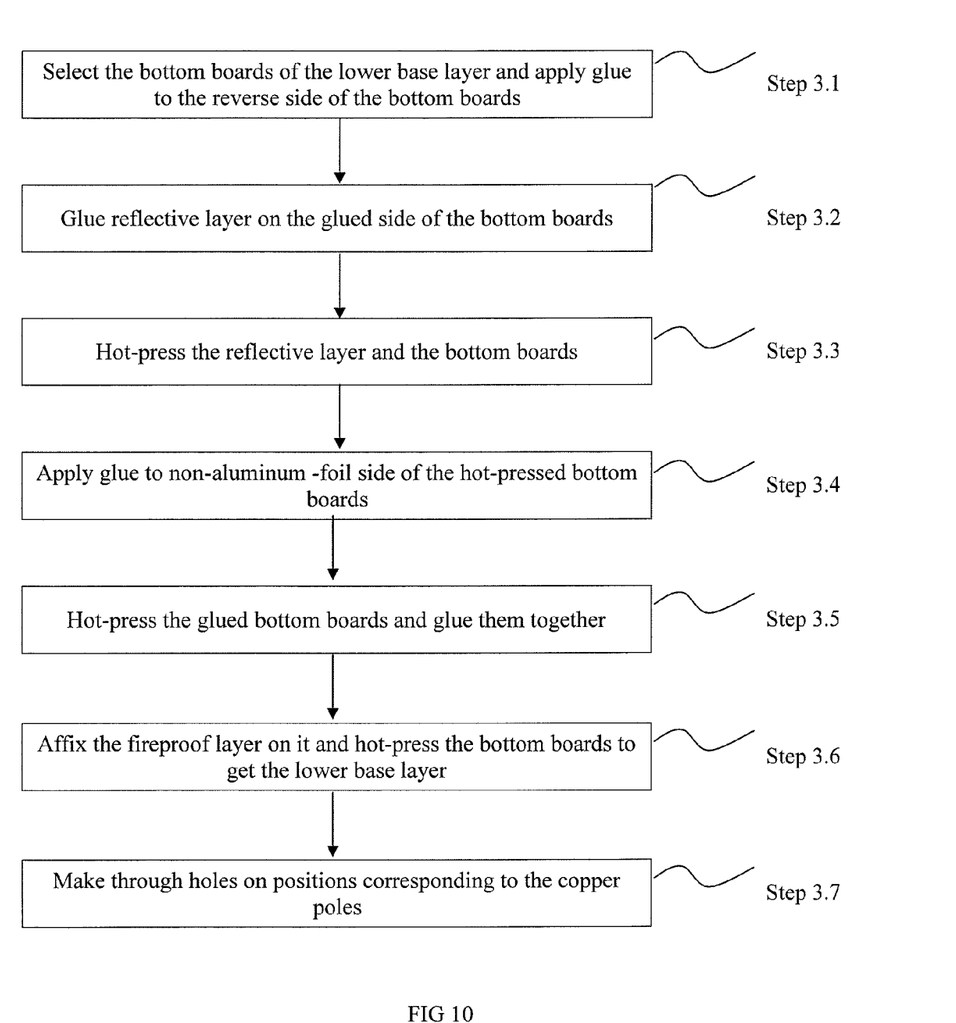
FIG. 10 is a step-by-step flow chart for Step 3 of the preparation method of the low-temperature heat-generating wood flooring of the present invention.

Step 3.1: Select the bottom boards of the lower base layer (4); the bottom boards can use one or a combination of more from lauan, poplar, beech or imported weedtree, and preference is given to beech; glue the back surfaces of the bottom boards.

Step 3.2: The reflecting layer (41) is affixed to the glued surfaces of the bottom boards; the length of the reflecting layer (41) is equal to the length of the bottom boards.

Step 3.3: Hot-press the reflecting layer (41) and the bottom boards at the pressure of about 80 tons-150 tons within 5-30 minutes.

Step 3.4: Glue the non-reflecting layer of the hot-pressed bottom boards in Step 3.3.

Step 3.5: apply glue to both sides of other bottom boards and orderly arrange these boards with the glued bottom boards obtained in step 3.4 in a criss-crossed and layered form, and bond them together to form 4 to 6 layers.

Step 3.6: Affix the fireproof layer (5) after gluing the upper side of the bottom boards prepared in Step 3.5; preference for the fireproof layer (5) is given to melamine impregnated paper; the width of the fireproof layer (5) is equal to the width of the bottom boards; then conduct hot-pressing to form the lower base layer (4).

Step: 3.7: Provide through holes (42) on the lower base layer (4) in accordance with the positions of the copper poles (31).

Figure 11:
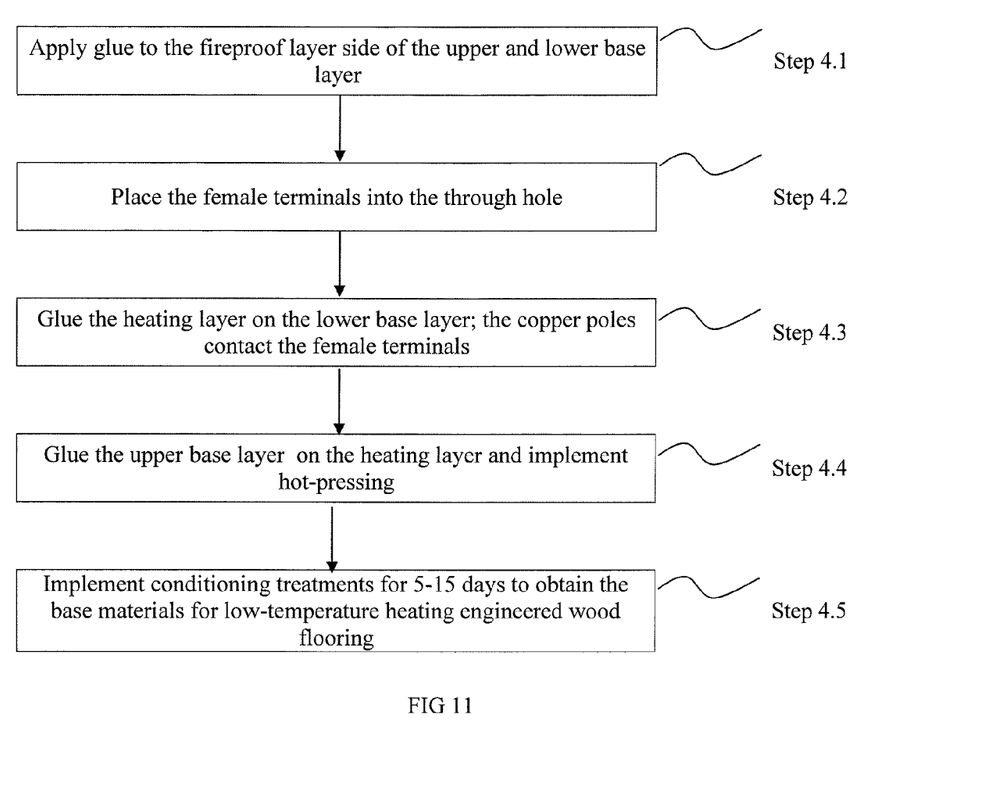
FIG. 11 is a step-by-step flow chart for Step 4 of the preparation method of the low-temperature heat-generating wood flooring of the present invention.

Step 4: Prepare the substrate of the low-temperature heat-generating wood flooring by hot-pressing Step 4.1: Glue said upper base layer (2) and the fireproof layer (5) surface of the lower base layer (4).

Step 4.2: Pre-provide the female terminals (62) of the terminals (6) in the through holes (42) of the lower base layer (4).

Step 4.3: Affix the heat-generating layer (3) above the lower base layer (4), and confirm that the copper poles (31) on the heat-generating layer (3) are in sufficient contact with the female terminals (62)

Step 4.4: Affix the upper base layer (2) above the heat-generating layer (3) and conduct hot-pressing under the pressure of 800 tons-1200 tons within 10-60 minutes.

Figure 12:
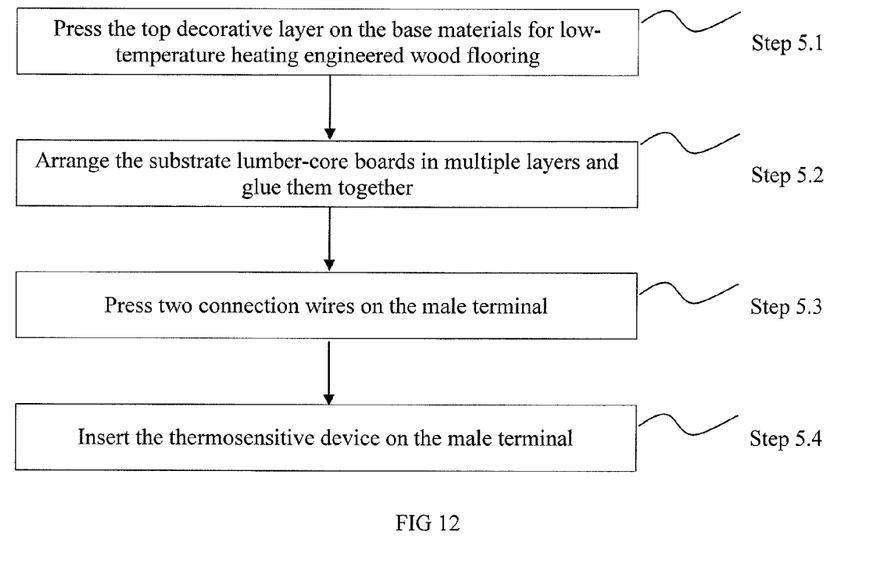
FIG. 12 is a step-by-step flow chart for Step 5 of the preparation method of the low-temperature heat-generating wood flooring of the present invention.

Step 4.5: Conduct a 5-15 day conditioning treatment after the hot-pressing in Step 4.4 to form the substrate of the low-temperature heat-generating wood flooring Step 5: Provide the terminals (6) and the thermosensitive device on the substrate of the low-temperature heat-generating wood flooring Step 5.1: Press the top decorative layer (1) above the substrate of the low-temperature heat-generating wood flooring to form the low-temperature heat-generating wood flooring; the top decorative layer (1) can use oak, teak, merbau and cumaru, etc.

Step 5.2: Press fit the connection wires (63) on the male terminals (61), and two connection wires (63) are one-time press fit on one male terminal (61).

Step 5.3: The connection male terminal (65) and the connection female terminal (64) are one-time press fit to the other end of the two connection wires (63); the connection male terminal (65) connects to another connection female terminal in the same device, and the connection female terminal (64) connects to another connection male terminal in the same device for its circuit connection with other low-temperature heat-generating wood flooring Step 5.4: Insert the thermosensitive device on the male terminal (61).

Embodiment 1

Step 1: Prepare the upper base layer (2) by hot-pressing

Step 1.1: Select lauan and beech to form the substrate lumber-core boards and glue them with urea-formaldehyde resin adhesive.

Step 1.2: Arrange the glue-applied substrate lumber-core boards in Step 1.1 in an orderly criss-crossed and layered form, and bond them together to form 3 layers.

Step 1.3: apply glue to the bottom of the substrate lumber-core boards in Step 1.2 and affix melamine impregnated paper as the fireproof layer (5); the length and width of the melamine impregnated paper match the substrate lumber-core boards.

Step 1.4: Hot-press the substrate lumber-core boards prepared in Step 1.3 to form the upper base layer (2).

Step 2: Prepare the heat-generating layer (3) by hot-pressing

Step 2.1: Impregnate the carbon fiber conductive paper with 10% concentration PVA solution; after the impregnation, the PVC adhesion amount on the carbon fiber conductive paper is 20%; then dry the carbon fiber conductive paper Step 2.2: Conduct impregnating resin processing of the carbon fiber conductive paper prepared in step 2.1 by ammoniation methyl phenolic resin.

Step 2.3: Conduct carbonization of the carbon fiber conductive paper prepared in Step 2.2 at a temperature of 250° C. in 10 minutes Step 2.4: Cut out the carbon fiber conductive paper prepared in Step 2.3 according to actual needs; the length and width of the carbon fiber conductive paper can be 850*100 mm, 1200*115 mm or 1400*115 mm.

Step 2.5: Press and stab the copper poles (31) respectively on the short-ways of the cut carbon fiber conductive paper in Step 2.4; the width of the copper poles (31) is equal to the width of the carbon fiber conductive paper.

Step 2.6: Hot-press the carbon fiber conductive paper after a polyethylene terephthalate resin layer (32) is covered on the front surface and the back surface of the carbon fiber conductive paper after pressing and stabbing the copper poles (31) in Step 2.5 at the temperature of 200° C. under the pressure of 80 kg/cm$^2$ in 15 minutes.

Step 3: Prepare the lower base layer (4) by hot-pressing

Step 3.1: Select beech for the bottom boards of the lower base layer (4), and apply glue to the back surfaces of the bottom boards Step 3.2: An aluminum foil is affixed as the reflecting layer (41) to the glue-applied surfaces of the bottom boards; the thickness of the aluminum foil is 0.1 mm; the length of the reflecting layer (41) is equal to the length of the bottom boards Step 3.3: Hot-press the reflecting layer (41) and the bottom boards at a pressure of about 100 tons in 10 minutes Step 3.4: apply glue to the non-aluminum-foil surface of the hot-pressed bottom boards in Step 3.3.

Step 3.5: apply glue to both sides of other bottom boards and arrange these boards with the glued bottom boards obtained in Step 3.4 in an orderly criss-crossed and layered form, and bond them together to form 6 layers Step 3.6: Affix melamine impregnated paper after gluing the upper side of the bottom boards prepared in Step 3.5; the width of the melamine impregnated paper is equal to the width of the bottom boards; then conduct hot-pressing to form the lower base layer (4).

Step: 3.7: Provide through holes (42) in the diameter of 6 mm on the lower base layer (4) in accordance with the positions of the copper poles (31)

Step 4: Prepare the substrate of the low-temperature heat-generating wood flooring by hot-pressing Step 4.1: Glue said upper base layer (2) and the melamine impregnated paper surface of the lower base layer (4)

Step 4.2: Pre-provide the female terminals (62) of the terminals (6) in the through holes (42) of the lower base layer (4).

Step 4.3: Affix the heat-generating layer (3) above the lower base layer (4), and confirm that the copper poles (31) on the heat-generating layer (3) are in sufficient contact with the female terminals (62)

Step 4.4: Affix the upper base layer (2) above the heat-generating layer (3) and conduct hot-pressing under a pressure of 800 tons in 15 minutes.

Step 4.5: Conduct a 10-day conditioning treatment after the hot-pressing in Step 4.4 to form the substrate of the low-temperature heat-generating wood flooring Step 5: Provide the terminals (6) and the thermosensitive device on the substrate of the low-temperature heat-generating wood Step 5.1: Press the top decorative layer (1) above the substrate of the low-temperature heat-generating wood flooring to form the low-temperature heat-generating wood flooring; the top decorative layer (1) can use oak, teak, merbau and cumaru, etc Step 5.2: Press-fit the connection wires (63) on the male terminals (61), and two connection wires (63) are one-time press fit on one male terminal (61)

Step 5.3: The connection male terminal (65) and the connection female terminal (64) are one-time press-fit to the other end of the two connection wires (63); the connection male terminal (65) connects to another connection female terminal in the same device, and the connection female terminal (64) connects to another connection male terminal in the same device, for its circuit connection with other low-temperature heat-generating wood flooring.

Step 5.4: Insert the thermosensitive device on the male terminal (61); the maximum bearable temperature of the thermosensitive device is 65° C., and the maximum current intensity is 240 mA Embodiment 2

The Following Steps are Adopted to Improve Embodiment 1

Step 1: Prepare the upper base layer (2) by hot-pressing

Step 1.1: Select lauan and imported weedtree to form the substrate lumber-core boards and glue them with polyurethane resin Step 1.2: Arrange the glued substrate lumber-core boards in Step 1.1 in an orderly criss-crossed and layered form, and bond them together to form 4 layers Step 1.3: Glue the bottom of the substrate lumber-core boards in Step 1.2 and affix melamine impregnated paper as the fireproof layer (5); the length and width of the melamine impregnated paper match the substrate lumber-core boards Step 1.4: Hot-press the substrate lumber-core boards prepared in Step 1.3 to form the upper base layer (2).

Step 2: Prepare the heat-generating layer (3) by hot-pressing

Step 2.1: Impregnate the carbon fiber conductive paper with 15% concentration PVA solution; after the impregnation, the PVC adhesion amount on the carbon fiber conductive paper is 25%; then dry the carbon fiber conductive paper Step 2.2: Conduct impregnating resin processing of the carbon fiber conductive paper prepared in step 2.1 by ammoniation methyl phenolic resin Step 2.3: Conduct carbonization of the carbon fiber conductive paper prepared in Step 2.2 at the temperature of 300° C. in 15 minutes Step 2.4: Cut out the carbon fiber conductive paper prepared in Step 2.3 according to actual needs; the length and width of the carbon fiber conductive paper can be 850*100 mm, 1200*115 mm or 1400*115 mm Step 2.5: Press and stab the copper poles (31) on the short-ways of the cut carbon fiber conductive paper in Step 2.4; the width of the copper poles (31) is equal to the width of the carbon fiber conductive paper Step 3: prepare the lower base layer (4) by hot-pressing Step 3.1: Select lauan for the bottom boards of the lower base layer (4), and glue the back surfaces of the bottom boards.

Step 3.2: An aluminum foil with a thickness of 0.1 mm is affixed as the reflecting layer (41) to the glued surfaces of the bottom boards; the length of the reflecting layer (41) is equal to the length of the bottom boards Step 3.3: Hot-press the reflecting layer (41) and the bottom boards at the pressure of about 100 tons in 10 minutes Step 3.4: Glue the non-aluminum-foil surface of the hot-pressed bottom boards in step 3.3

Step 3.5: apply glue to both sides of other bottom boards and arrange them with the glued bottom boards obtained in Step 3.4 in an orderly criss-crossed and layered form, and bond them together to form 5 layers.

Step 3.6: Affix melamine impregnated paper as the fireproof layer (5) after gluing the upper end of the bottom boards prepared in Step 3.5; the width of the fireproof layer (5) is equal to the width of the bottom boards; then conduct hot-pressing to form the lower base layer (4).

Step: 3.7: Provide through holes (42) in the diameter of 10 mm on the lower base layer (4) in accordance with the positions of the copper poles (31)

Step 4: Prepare the substrate of the low-temperature heat-generating wood flooring by hot-pressing Step 4.1: Glue said upper base layer (2) and the melamine impregnated paper surface of the lower base layer (4)

Step 4.2: Pre-provide the female terminals (62) of the terminals (6) in the through holes (42) of the lower base layer (4)

Step 4.3: Affix the heat-generating layer (3) above the lower base layer (4), and confirm that the copper poles (31) on the heat-generating layer (3) are in sufficient contact with the female terminals (62)

Step 4.4: Affix the upper base layer (2) above the heat-generating layer (3) and conduct hot-pressing under a pressure of 1000 tons in 10 minutes.

Step 4.5: conduct a 15-day conditioning treatment after the hot-pressing in Step 4.4 to form a substrate of the low-temperature heat-generating wood flooring Step 5: Provide the terminals (6) and the thermosensitive device on the substrate of the low-temperature heat-generating wood flooring Step 5.1: Press the top decorative layer (1) above the substrate of the low-temperature heat-generating wood flooring to form a low-temperature heat-generating wood flooring; the top decorative layer (1) can use oak, teak, merbau and cumaru, etc Step 5.2: Press fit the connection wires (63) on the male terminals (61), and two connection wires (63) are one-time press fit on one male terminal (61)

Step 5.3: The connection male terminal (65) and the connection female terminal (64) are one-time press-fit to the other end of the two connection wires (63); the connection male terminal (65) connects to another connection female terminal in the same device, and the connection female terminal (64) connects to another connection male terminal in the same device, for its circuit connection with other low-temperature heat-generating wood flooring Step 5.4: Insert the thermosensitive device on the male terminal (61); the maximum temperature of the thermosensitive device is 65° C., and the maximum current intensity is 240 mA In conclusion, the present invention relates to a low-temperature heat-generating wood flooring with a maximum temperature of 50° C.-55° C. It remains at a low temperature while it continues heating; therefore the flooring will not deform, crack or burn. The present invention uses carbon fiber conductive paper, the thermal conversion efficiency of which can reach up to 97%, and is therefore more energy-efficient than traditional materials. Carbon fiber conductive paper transfers heat mainly by means of infrared radiation. The heat conduction can also release far infrared light waves of 8 µm-18 µm, which can revitalize water molecules in the human body, increase blood oxygen content, strengthen cell viability, improve body microcirculation and promote metabolism. The substrate of the low-temperature heat-generating wood flooring of the present invention, which has been shaped in high temperature, is an insulator and has a moisture content of around 6%. Moreover, the entire surface of the carbon fiber conductive paper is electrically conductive at general voltage (220V), the electric current density of which is extremely low. Combined with the substrate's properties, the carbon fiber conductive paper is harmless to the human body and can be used safely.

The low-temperature heat-generating solid wood laminate floor prepared by the method in the present invention is able to reduce the designed power per unit area of the floor, such that the highest temperature of the floor surface is 50° C.-55° C., thus solving problems such as floor deformation and cracking, and enhancing heat radiation and conduction. The present invention has uniform heat generation, saves energy and protects the environment, does no harm to the human body, and is convenient and safe in use, low in cost, and simple in structure.

The foregoing are specific embodiments for the low-temperature heating-engineered wood flooring and its preparation method for the present invention. Any device and structure not described hereinabove should be understood to be implemented using existing common devices and methods this field.

The invention claimed is:

1. A low-temperature heat-generating wood flooring, comprising: a top decorative layer (1), an upper base layer (2), a heat-generating layer (3) and a lower base layer (4) stacked and hot-pressed in sequence; wherein the upper base layer (2) is on top of the heat-generating layer (3) whereas the lower base layer (4) is underneath the heat-generating layer (3); wherein the top decorative layer (1) is hot-pressed on top of the upper base layer (2);

wherein, the top decorative layer (1), the upper base layer (2), the heat-generating layer (3) and the lower base layer (4) are in the form of a strip; a pair of copper poles (31) are disposed on widthwise edges on both ends of the heat-generating layer (3) and the width of the copper poles (31) is same as that of the heat-generating layer (3); wherein a fireproof layer (5) is disposed between the bottom of the upper base layer (2) and the heat-generating layer (3) whereas another fireproof layer (5) is disposed between the top of the lower base layer (4) and the heat-generating layer (3); wherein a reflective layer (41) is disposed on the bottom of the lower base layer (4); and wherein the upper base layer (2) is composed of substrate lumber-core boards arranged in 3 to 5 layers in a criss-cross way and glued together, whereas the lower base layer (4) is composed of bottom boards arranged in 4 to 6 layers in a criss-cross way and glued together.

2. The low-temperature heat-generating wood flooring of claim 1, wherein said heat-generating layer (3) is carbon fiber conductive paper and there are multiple small holes (33) on said carbon fiber conductive paper; said copper poles (31) are made of copper-aluminum foil by pressing.

3. The low-temperature heat-generating wood flooring of claim 1, wherein a pair of through holes (42) are disposed on both ends of said lower base layer (4) and the positions of the through holes (42) correspond to the positions of the copper poles (31) on said heat-generating layer (3).

4. The low-temperature heat-generating wood flooring of claim 1 further comprising: terminals (6) and thermosensitive elements;

wherein said terminals (6) include male terminals (61), female terminals (62), connection male terminals (65), connection female terminals (64) and a pair of connection wires (63); the size of said connection male terminals (65) corresponds to the size of the connection female terminals (64); the size of the male terminals (61) corresponds to the size of the female terminals (62); the female terminals (62) are disposed in the through hole (42) of the lower base layer (4) and contacts the copper poles (31) on said heat-generating layer (3); a pair of connection wires (63) are disposed on the male terminals (61) by press fitting; the connection male terminal (65) is externally connected to a connection female terminal in the same device; the connection female terminal (64) is externally connected to a male terminal in the same device; and wherein said thermosensitive elements are disposed on the male terminals (61).

5. A preparation method for the low-temperature heat-generating wood flooring of claim 1, wherein the method comprises at least the following steps:

Step 1: prepare the upper base layer (2) by hot-pressing;
Step 2: prepare the heat-generating layer (3) by hot-pressing;
Step 3: prepare the lower base layer (4) by hot-pressing;
Step 4: prepare the substrate of the low-temperature heat-generating wood flooring by hot-pressing; and
Step 5: install terminals (6) and the thermosensitive elements on the low-temperature heat-generating wood flooring.

6. The preparation method for the low-temperature heat-generating wood flooring of claim 5, wherein said Step 1 comprises:

Step 1.1: select and apply glue to substrate lumber-core boards;

Step 1.2: arrange the glued substrate lumber-core boards of Step 1.1 in a criss-cross way in 3-5 layers and glue them together;

Step 1.3: apply glue to the bottom of the substrate lumber-core boards of Step 1.2, and affix the fireproof layer (5) on it; the length and width of the fireproof layer (5) correspond to those of the substrate lumber-core boards; and Step 1.4: make the upper base layer (2) by hot-pressing the substrate lumber-core boards processed in Step 1.3.

7. The preparation method for the low-temperature heat-generating wood flooring of claim 5, wherein said Step 2 further comprises:

Step 2.1: dip treat the carbon fiber conductive paper with polyvinyl alcohol solution with a concentration of 10%-20%; after the dip treatment, the adhesion of polyvinyl alcohol on the carbon fiber conductive paper is 15%-30%; then dry the carbon fiber conductive paper;

Step 2.2: carry out impregnation resin treatment on the carbon fiber conductive paper of Step 2.1 with resin made from one or several of thermosetting phenolic resin or epoxy resin;

Step 2.3: carry out carbonization treatment on the carbon fiber conductive paper obtained in Step 2.2;

Step 2.4: trim the carbon fiber conductive paper obtained in Step 2.3;

Step 2.5: press copper poles (31) on two wide edges of the carbon fiber conductive paper obtained trimmed in Step 2.4, respectively; the width of the copper poles (31) is same as the width of the carbon fiber conductive paper;

Step 2.6: heat the carbon fiber conductive paper on which the copper poles (31) are pressed in Step 2.5; and Step 2.7: glue nail the carbon fiber conductive paper obtained in Step 2.6 to prepare the heat-generating layer (3).

8. The preparation method for the low-temperature heat-generating wood flooring of claim 5, wherein said Step 3 comprises:

Step 3.1: select the bottom boards for the lower base layer (4) and apply glue to one side of the bottom boards;

Step 3.2: glue reflective layer (41) on the glue-applied side of the bottom boards; the length of the reflective layer (41) is same as that of the bottom boards;

Step 3.3: hot-press the reflective layer (41) and the bottom boards;

Step 3.4: apply glue to the other side of the hot-pressed bottom boards prepared in step 3.3;

Step 3.5: apply glue to both sides of other bottom boards for the lower base layer and arrange these boards with the bottom boards prepared in Step 3.4 in a criss-cross way and in 4 to-6 layers and glue them together;

Step 3.6: apply glue to the upper side of the bottom boards obtained in Step 3.5 and glue the fireproof layer (5) on it; the width of the fireproof layer (5) is same as that of the bottom boards; hot-press the bottom boards to get the lower base layer (4); and Step 3.7: make through holes (42) on the lower base layer (4); the positions of the through holes (42) correspond to the positions of the copper poles (31).

9. The preparation method for the low-temperature heat-generating wood flooring of claim 5, wherein said Step 4 comprises:

Step 4.1: apply glue to the side with fireproof layer (5) of the upper base layer (2) and lower base layer (4);

Step 4.2: place the female terminals (62) of the terminals (6) into the through hole (42) of the lower base layer (4);

Step 4.3: glue the heat-generating layer (3) on the lower base layer (4); the copper poles (31) on the lower base layer (4) contact the female terminals (62);

Step 4.4: paste and cover the heat-generating layer (3) with the upper base layer (2) and implement hot-pressing thereon; and Step 4.5: implement conditioning treatments on base materials hot-pressed in Step 4.4 for 5-15 days to obtain the base materials for low-temperature heat-generating wood flooring.

10. The preparation method for the low-temperature heat-generating wood flooring of claim 5, wherein said Step 5 comprises:

Step 5.1: press the top decorative layer (1) on the base materials for low-temperature heat-generating wood flooring to obtain low-temperature heat-generating wood flooring;

Step 5.2: press the connection wires (63) on the male terminals (61); press two connection wires (63) on one male terminal (61);

Step 5.3: press the connection male terminals (65) and the connection female terminals (64) respectively on the other end of said pair of connection wires (63); and Step 5.4: insert thermosensitive elements in the male terminal (61).

11. The low-temperature heat-generating wood flooring of claim 2, wherein a pair of through holes (42) are disposed on both ends of said lower base layer (4) and the positions of the through holes (42) correspond to the positions of the copper poles (31) on said heat-generating layer (3).

\* \* \* \* \*

UNITED STATES PATENT AND TRADEMARK OFFICE
CERTIFICATE OF CORRECTION

PATENT NO. : 8,866,048 B2
APPLICATION NO. : 14/130620
DATED : October 21, 2014
INVENTOR(S) : Bing Sun and Yuming Zhang It is certified that error appears in the above-identified patent and that said Letters Patent is hereby corrected as shown below:

On the Title Page, Item 73, Assignee, "Shanghai Rell Electric Heating Systems Co., Ltd," should read -- Shanghai Reli Electric Heating Systems Co., Ltd, --.

Signed and Sealed this
Seventeenth Day of February, 2015

Michelle K. Lee
*Deputy Director of the United States Patent and Trademark Office*